(12) United States Patent
Jack et al.

(10) Patent No.: US 11,011,899 B2
(45) Date of Patent: May 18, 2021

(54) POSITION-ADJUSTABLE RECEPTACLE AND FASTENERS THEREFOR

(71) Applicant: Electrical Improvement Products LLC, Corning, NY (US)

(72) Inventors: Robert W. Jack, Corning, NY (US); Gary J. Dimas, Hammondsport, NY (US)

(73) Assignee: ELECTRICAL IMPROVEMENT PRODUCTS LLC, Corning, NY (US)

( * ) Notice: Subject to any disclaimer, the term of this patent is extended or adjusted under 35 U.S.C. 154(b) by 176 days.

(21) Appl. No.: 16/409,832

(22) Filed: May 12, 2019

(65) Prior Publication Data

US 2019/0267783 A1 Aug. 29, 2019

Related U.S. Application Data

(63) Continuation of application No. 15/818,992, filed on Nov. 21, 2017, now Pat. No. 10,291,006, which is a
(Continued)

(51) Int. Cl.
*H02G 3/00* (2006.01)
*H02G 3/08* (2006.01)
(Continued)

(52) U.S. Cl.
CPC ........... *H02G 3/086* (2013.01); *H01R 25/006* (2013.01); *H02G 3/12* (2013.01); *H02G 3/18* (2013.01)

(58) Field of Classification Search
CPC ............ H02G 3/086; H02G 3/10; H02G 3/12; H02G 3/18; H02G 3/125; H02G 3/20;
(Continued)

(56) References Cited

U.S. PATENT DOCUMENTS 2,249,471 A 11/1939 Hamm
3,885,847 A 5/1975 Thibeault
(Continued)

OTHER PUBLICATIONS

Pass & Seymour Installation Instructions SHIM-LOCK TM P/N 340763 Rev.C. Document dated Oct. 23, 2008. EFS file name: 20190807_16-409832_IDS_NPL_Cite1.
(Continued)

*Primary Examiner* — Pete T Lee
(74) *Attorney, Agent, or Firm* — Patent Innovations LLC; John M. Hammond

(57) ABSTRACT

A fastener assembly for joining a first part to a second part, and comprising an adjustment fastener and a screw. The adjustment fastener comprises a body including opposed first and second planar and parallel side walls, and a threaded hole extending along a central axis through the body from the first side wall to the second side wall; and a tang joined to the flat body adjacent to the threaded hole and extending outwardly from the first side wall in a direction parallel to the central axis. The screw comprises a head and an elongated threaded shank. The head of the screw is disposable against an ear of the first part. The threaded shank extends through an oblong hole of the ear of the first part, and engages with and extends through the threaded hole of the adjustment fastener, and is engageable with threads in a tab of the second part.

11 Claims, 9 Drawing Sheets

Related U.S. Application Data continuation of application No. 15/381,081, filed on Dec. 15, 2016, now Pat. No. 9,859,696.

(51) Int. Cl.
*H02G 3/18* (2006.01)
*H02G 3/12* (2006.01)
*H01R 25/00* (2006.01)

(58) Field of Classification Search
CPC ...... H02G 15/06; H02G 15/076; H02G 3/088; H02G 3/16; H05K 1/181; H05K 1/182; H05K 3/301
See application file for complete search history.

(56) References Cited

U.S. PATENT DOCUMENTS

| | | | |
|---|---|---|---|
| 4,051,321 A | 9/1977 | Buell | |
| D491,537 S | 6/2004 | Whorley | |
| 7,087,837 B1* | 8/2006 | Gretz | H02G 3/121 |
| | | | 174/53 |
| 8,022,297 B1* | 9/2011 | Thibault | H02G 3/185 |
| | | | 174/135 |
| 8,076,578 B1 | 12/2011 | Gretz | |
| 8,415,563 B1* | 4/2013 | Shotey | H02G 3/126 |
| | | | 174/58 |
| 8,575,484 B1* | 11/2013 | Witherbee | H02G 3/14 |
| | | | 174/58 |
| 2004/0134678 A1 | 7/2004 | Kidman | |
| 2007/0158951 A1 | 7/2007 | Ramsauer et al. | |
| 2014/0238738 A1 | 8/2014 | Korcz | |

OTHER PUBLICATIONS

Pass & Seymour SHL100 Shim-Lock product brochure. Publication date unknown. EFS file name: 20190807_16-409832_IDS_NPL_Cite2.

Screen image of Legrand YouTube web page viewable on Mar. 18, 2017 at https://www.youtube.com/watch?v=SBxfUheHGRs, "Pass & Seymour: How to Use ShimLock," uploaded Jan. 19, 2011. EFS file name: 20190807_16-409832_IDS_NPL_Cite3.

* cited by examiner

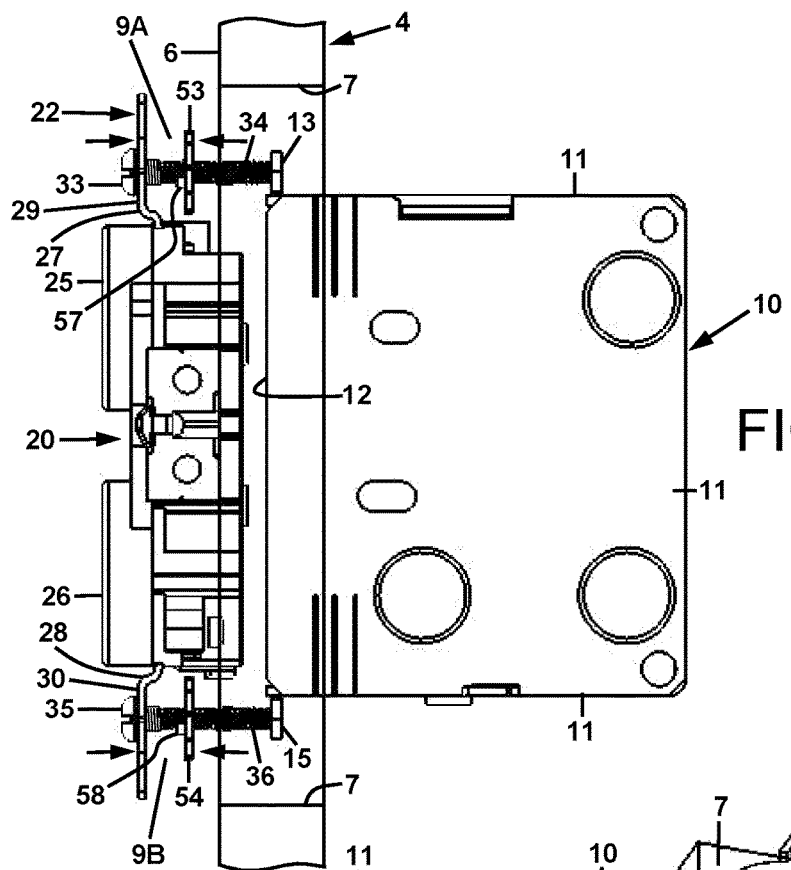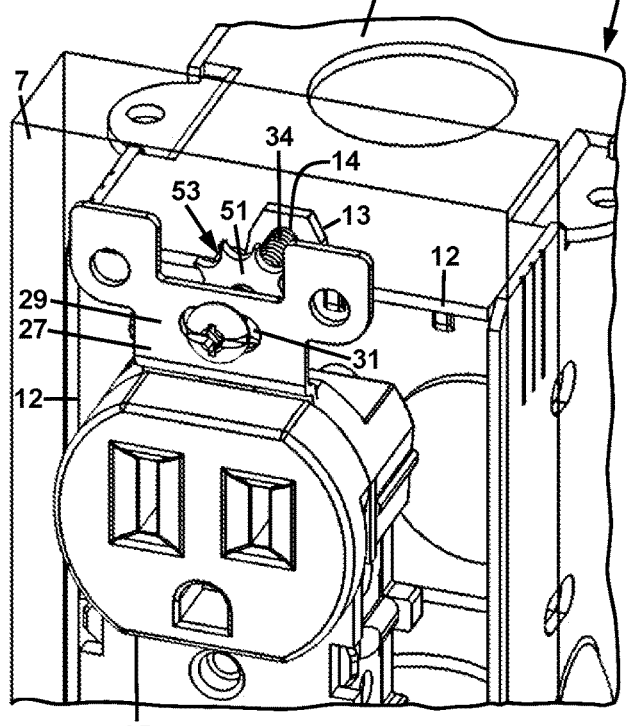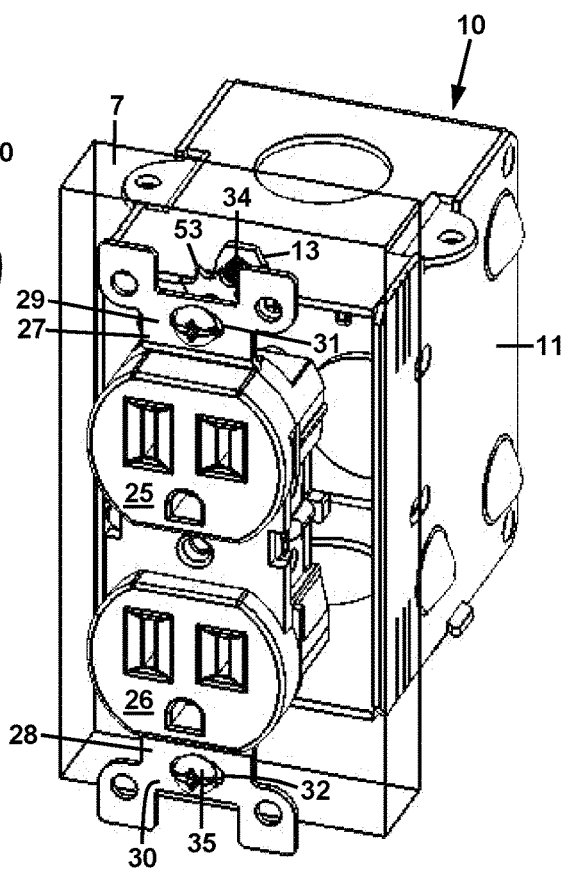
FIG. 7A
FIG. 7B
FIG. 7C

POSITION-ADJUSTABLE RECEPTACLE AND FASTENERS THEREFOR

CROSS-REFERENCE TO RELATED PATENT APPLICATIONS

This application is a continuation of copending U.S. patent application Ser. No. 15/818,992, filed on Nov. 21, 2017 and issued as U.S. Pat. No. 10,291,006 on May 14, 2019, which is a continuation of copending U.S. patent application Ser. No. 15/381,081, filed on Dec. 15, 2016 and issued as U.S. Pat. No. 9,859,696 on Jan. 1, 2018, the disclosures of which are incorporated herein by reference. The above priority claims are being made in an Application Data Sheet submitted herewith in accordance with 37 C.F.R. 1.76 (b)(5) and 37 C.F.R. 1.78.

BACKGROUND

Technical Field

Wall and ceiling mounted electrical outlets for housing electrical receptacles, electrical fixtures, and other utility devices, and in particular, position-adjustable receptacles and fasteners for providing adjustability of receptacle mounting position.

Description of Related Art

In modern residential, commercial, and industrial building construction, electrical wiring is installed within the walls of buildings. (Such "walls" as recited in this disclosure include vertical walls, and horizontal walls, i.e., floors and ceilings of rooms.) In like manner, communications wiring, such as telephone wiring, Ethernet ("Category 5") cable, coaxial television (RG) cable is also installed in building walls. Moreover, fiber optic communication cables are also installed in building walls, and in some ways, have similarities to electrical wiring installation.

In order to make use of such wiring in a building, access to the wiring must be provided by installing boxes in the walls, within which connections to the wiring can be made. Such boxes enclose the wiring connections and provide the functions of fire protection and electrical shock prevention to people in the building, as well as acting as mounting components for various electrical devices mounted to the boxes.

In the construction of a building wall, wood or metal framing studs are often used to provide the supporting structure of the wall. Subsequently, drywall, or another suitable wall panel material is joined to the framing to form the complete wall. Once the drywall is joined to the framing, such framing is no longer easily accessible without cutting out portions of the drywall. For this reason, it is highly desirable to install all electrical wiring within the wall before joining the drywall to the framing. This installation of wiring includes the electrical junction boxes that will hold the various electrical devices, such as electrical receptacles, and others as recited above.

In a typical wall construction project, such electrical boxes will have predetermined locations, often defined by building and or electrical codes, such as the National Electrical Code. The location of a particular electrical box is made as a fixed location by joining the electrical box to a wall stud, which may be a vertical stud in a vertical wall, or a horizontal ceiling or floor joist in the case of a horizontal wall. Such joining of an electrical box to a wall stud is typically done using screws or nails, and establishes the location of the box in the wall—e.g., for a vertical wall, the height above the floor, and the left-right location.

However, such joining of an electrical box to a wall stud also establishes the location of the front opening of the electrical box (which is to subsequently receive an electrical fixture, such as a receptacle) relative to the plane of the wall framing, and therefore the plane of the surface of the drywall (or other wall panel material) that is to be joined to the framing. It is highly desirable that the electrical box be joined to the stud such that the front opening of the electrical box is coplanar with the surface of the drywall that is joined to the framing, so that the outer surface of any electrical fixture that is installed in the electrical box is also coplanar with the surface of the drywall. Because the drywall is not present at the time the electrical box is joined to the stud, the construction worker must estimate by eye the distance to have the front opening of the electrical box protrude beyond the stud so that it is coplanar with the surface of the drywall after the drywall is installed. This is often not accomplished consistently, due to the need for haste in construction and/or the tedium of the task. An alternative procedure would be to hold a ruler or tape measure or piece of wall board to show the required offset of the front opening of the box from the front surface of the stud, place the box at the desired location, drop the ruler, pick up a screw driver and screw or a hammer and nail, and join the box to the stud with a first nail or screw. It is easy to see that this procedure requires two people (not desirable in view of labor costs), or is very difficult to execute effectively by one person.

Accordingly, problems result from the lack of proper location of the electrical box when it is joined to the stud. Such problems are best understood with reference to FIGS. 1A-4, which illustrate the various problems using an electrical box that holds an electrical receptacle, which typically provides 120 volts AC to electrical devices (not shown) connected thereto.

Firstly, it is noted that in FIGS. 1A-11D that are a part of this disclosure, the wall panel that is depicted therein is shown as if it were transparent, such as a piece of glass. This is done for clarity of illustration, so that the various components or portions thereof that would otherwise be hidden by the wall, as well as their relationships to the wall can be "seen" and understood. In actual applications, an opaque material such as drywall, plywood, or wood paneling is far more likely to be used as wall panel material.

FIGS. 1A and 1B depict a conventional electrical receptacle mounted in a desired position, with the front opening of a box that holds the receptacle being coplanar with the surface of the wall in which the box is mounted. This desired position is obtained when the electrician joins the box 10 to the stud 2 such that the front opening 12 of the box 10 protrudes beyond the front surface 3 of the stud by an amount equal to the thickness 5 of the wall panel 4 (such as drywall) to be joined to the stud 2. Thus when a cutout 7 is made at the proper location in the wall panel 4, and the wall panel 4 is joined to the stud 2 (or other wall framing), the box 10 protrudes through the cutout 7 in the wall panel 4 such that the front opening 12 of the box 10 is coplanar with the outer surface 6 of the wall panel 4.

The benefits of this arrangement are readily apparent. The receptacle 20 is comprised of a planar plate 22 of material, such as metal plate. (See also FIG. 5.) When the receptacle 20 is joined to the box 10 by upper and lower screws 23 and 24 engaged with threaded holes 14 and 16, which are provided in upper and lower tabs 13 and 15, the back side planar plate 22 of the receptacle is also coplanar with the front opening 12 of the box 10. This relationship enables the joining of the cover plate 40 to the receptacle as shown in FIG. 1A, with the outer back edge 42 of the cover plate 40 being contiguous with the outer surface 6 of the wall panel 4. Additionally, the plug holes 43 and 44 of the cover plate 40 are in close proximity to the plug bodies 25 and 26 of the receptacle 20. This close fit is highly desirable for both safety (fire and shock prevention) and aesthetic reasons.

FIG. 2 depicts a first problem caused by an electrical box misjoined to a stud. In this situation, the box 10 is joined to the stud 2 such that the front opening 12 is located beyond the plane defined by the outer surface 6 of the wall 4. Thus when the receptacle 20 is joined to the box 10, and the cover 40 (also commonly referred to as a "face plate") is joined to the receptacle 20, the back edge 42 of the cover is separated from the outer surface 6 of the wall 4 by a gap 8. This is undesirable for at least two reasons. The appearance of a receptacle 20 with a cover plate 40 separated from the wall surface 6 is very undesirable, as it gives the impression of "shoddy work." Additionally, a receptacle face plate 40 that is not firmly seated against the surface 6 of the wall 4 is a violation of the National Electrical Code.

This problem is the most difficult one to fix, because once the drywall 4 is joined to the stud 2, then the electrical box 10 cannot be moved back on the stud 2 to a desired location without cutting out a much larger cutout, and then having to repair that damage. If the gap 8 is relatively small, it may be accommodated by "mudding" around the cutout 7, i.e., thickening the wall area around the cutout 7 by troweling a layer of drywall compound and sanding it down to roughly a planar appearance around the cutout. However, this is an undesirable option because it is time consuming and messy. Moreover, if the gap 8 is too large, this countermeasure is not an option.

For this reason, electricians consistently err in the opposite direction: they commonly join the box 10 to the stud 2 such that the front opening 12 is recessed beneath the plane defined by the outer surface 6 of the wall 4, as shown in FIG. 3. This situation is common because the problem it causes can be more readily solved to some extent, albeit in a time consuming manner. It can be seen in FIG. 3 that the receptacle 20 has been joined to the box 10 with its planar plate 22 contiguous with the front opening 12 of the box 10. As a result, when the cover plate 40 is joined to the receptacle 20 by screw 46, with the back edge 42 of the plate contiguous with the surface 6 of the wall panel 4, the plug bodies 25 and 26 do not extend into the plug holes 43 and 44 of the cover plate. This is undesirable for the same reasons as set forth for the situation depicted in FIG. 2. Additionally, if the screw 46 is tightened beyond the degree shown in FIG. 3, it will crack a cover plate made of plastic, and bend one made of metal.

A related problem occurs when the "plaster ears" of a receptacle have minimal or no overlap with the cutout made in the drywall. In preparing a cutout for receptacle in a sheet of drywall, a routered wall board cutout opening is often cut too large, such that the receptacle plaster ears do not overlap sufficiently. Under such circumstances, there is no "footprint," or insufficient footprint, i.e. contact of the plaster ears on the drywall outer surface. Thus when the receptacle receives a plug pushed in by a user, the small area of overlap by the ears onto the drywall cutout edges will often crumble the drywall there. Plaster ears that are only engaged slightly with the edges of the cutout may also bend, or even break off, because such ears are manufactured with breakaway scores for easy removal. Additionally, when wood framing is used, the wood studs may shrink over time or the wall board may settle. Any one of these problems, or a combination of them, may thus cause the receptacle will become loose and recede back into the wall when a plug is inserted. This problem has become especially more common in recent years with the mandated use of "child proof" Tamper Resistant Receptacles which require a great deal more force or pressure to insert plugs.

A crude solution to these problems is to "shim" the receptacle 20 out away from the box 10 by a distance equal to the gap 9, thereby bringing the planar plate 22 out so that it has the desired coplanarity with the surface 6 of the wall panel 4. This may be accomplished by placing stacks of washers (not shown) or "standoffs" (such as short lengths of tubing, not shown) between the heads of the screws 23 and 24 and the tabs 13 and 15 of the box 10. This is considered improvised and not an approved method using NEC code-approved components. Also, this is a time consuming and tedious process, and is highly undesirable in view of construction labor costs, especially when large numbers of electrical boxes are being installed in a construction project. Every misjoined box costs money to accommodate due to the absence of an approved practical solution.

FIG. 4 depicts yet another problem caused by an electrical box misjoined to a stud. In this situation, the box 10 is joined to the stud 2 such that the front opening 12 is skewed relative to the plane defined by the outer surface 6 of the wall 4. Thus when the receptacle 20 is joined to the box 10, and the cover 40 (not shown in FIG. 4) is joined to the receptacle 20, the cover 40 will not fit the receptacle 20 properly as shown in FIG. 1A. Possible solutions to this problem are as described for the problem depicted in FIG. 3, but with the use of unequal height standoffs or stacks of washers on the screws 23 and 24 to compensate for the amount of skew.

In spite of the basic design of electrical junction boxes, receptacles, lighting fixtures, and other box-mounted electrical fixtures having remained relatively unchanged for decades, the commonly encountered problems depicted in FIGS. 3 and 4 have remained without a satisfactory solution. Attempts have been made to provide fastener components that provide spacing adjustment capability in the installation of an electrical receptacle to an electrical box, but such attempts have not been satisfactory. Such fastener components have not been easy to use, and have not been reliable in performance.

What is needed is an inexpensive adjustable fastener, or an adjustable fastener assembly, that enables installation of an electrical fixture in an electrical box, such that if the electrical box is misjoined to the framing of a wall, the fastener or fastener assembly can be quickly and easily adjusted to compensate for the misjoining, thereby enabling the installation of the electrical fixture in the desired position in the wall.

SUMMARY

In a broad aspect, the present invention meets this need by providing a fastener for joining a first part to a second part, and a fastener assembly for joining a first part to a second part. The first part may be an electrical fixture, such as an electrical receptacle, and the second part may be an electrical box configured to have the electrical fixture mounted in or on it.

The fastener is comprised of a body including opposed first and second planar and parallel side walls, and a threaded hole extending along a central axis through the body from the first side wall to the second side wall; and a tang joined to the flat body adjacent to the threaded hole and extending outwardly from the first side wall in a direction parallel to the central axis. In certain embodiments, the tang may extend outwardly from the first side wall a distance of about the distance between the opposed first and second side walls. In certain embodiments, the opposed first and second side walls of the adjustment fastener terminate at a perimeter wall comprised of recessed notches and protruding teeth.

The fastener assembly is provided for joining a first part comprised of an ear having an oblong hole therethrough to a second part comprising a tab having a threaded hole therethrough. The fastener assembly includes the adjustment fastener described above. Additionally, the fastener assembly is comprised of a screw comprising a head and an elongated threaded shank. The head of the screw is disposable against the ear of the first part. The threaded shank extends through the oblong hole of the ear of the first part, and engages with and extends through the threaded hole of the adjustment fastener, and is also engageable with threads in the threaded hole of the tab of the second part. Thus when the position of the adjustment fastener on the threaded shank of the screw is adjusted to a desired location, the tang of the adjustment faster may be engaged with the oblong hole of the ear with the first side wall of the adjustment fastener contiguous with the ear of the first part, thereby immobilizing the adjustment fastener against the ear, and locating the first part at a fixed distance from the second part.

In another aspect, an electrical fixture that is mountable to a box is provided. The box is configured for such mounting, and is comprised of a side wall terminating at an outer edge defining a planar opening, a first tab extending outwardly from a first side region of the side wall along the plane of the planar opening and including a first threaded hole therethrough, and a second tab extending outwardly from an opposed second side region of the side wall along the plane of the planar opening and including a second threaded hole therethrough. The electrical fixture is comprised of first and second adjustment fasteners as described above, a planar plate, and first and second screws engageable with the first and second threaded holes in the respective first and second tabs of the box.

The planar plate of the electrical fixture is comprised of a first end region including a first ear with a first oblong hole therethrough, and an opposed second end region including a second ear with a second oblong hole therethrough. The first screw is comprised of a first head and a first elongated threaded shank. The first head of the first screw is disposable against the first ear of the planar plate of the electrical fixture, with the first threaded shank extending through the first oblong hole of the first ear, and engaged with and extending through the threaded hole of the first adjustment fastener, and engageable with threads in the first threaded hole of the first tab of the box. The second screw is comprised of a second head and a second elongated threaded shank. The second head of the second screw is disposable against the second ear of the planar plate of the electrical fixture, with the second threaded shank extending through the second oblong hole of the second ear, and engaged with and extending through the threaded hole of the second adjustment fastener, and engageable with threads in the second threaded hole of the second tab of the box.

When the position of the first adjustment fastener on the first threaded shank of the first screw is adjusted to a first desired location, the tang of the first adjustment faster is engaged with the oblong hole of the first ear with the first side wall of the first adjustment fastener contiguous with the first ear of the planar plate of the electrical fixture, thereby immobilizing the first adjustment fastener against the first ear, and locating the first ear of the planar plate of the electrical fixture at a fixed distance from the first tab of the box. In like manner, when the position of the second adjustment fastener on the second threaded shank of the second screw is adjusted to a second desired location, the tang of the second adjustment faster is engaged with the oblong hole of the second ear with the first side wall of the second adjustment fastener contiguous with the second ear of the planar plate of the electrical fixture, thereby immobilizing the second adjustment fastener against the second ear, and locating the second ear of the planar plate of the electrical fixture at a fixed distance from the second tab of the box.

In certain embodiments, the fixed distance between the planar plate of the electrical fixture and the first tab of the box may differ from the fixed distance between the planar plate of the electrical fixture and the second tab of the box. This capability is enabled by the positions of the first and second adjustment fasteners on the respective first and second screws being independently adjustable.

The electrical fixture may include further components that enable operability as an electrical receptacle, a lighting fixture, a ceiling fan, an alarm, a doorbell, a smoke detector, a thermostat, a telephone jack, a cable TV jack, and an Ethernet cable jack.

Advantageously, the fastener assembly of the present disclosure eliminates the relationship between a receptacle and a device mounting currently involving wall surface as a component required for proper assembly. The fastener assembly may be used with all electrical fixtures and device, and provides a universal solution for all installations. It completely eliminates a drywall panel or other wall panel as a component of the installation for all applications.

BRIEF DESCRIPTION OF THE DRAWINGS

The present disclosure will be provided with reference to the following drawings, in which like numerals refer to like elements, and in which:

FIG. 7A is a side elevation view of the components and wall, but with the adjustment fasteners engaged with the mounting screws of the electrical receptacle, and the mounting screws making initial contact with threaded tabs on the box;

FIG. 7B is a perspective view of the components and wall as depicted in FIG. 7A;

FIG. 7C is a detailed perspective view of the components and wall as depicted in FIG. 7B, showing the top adjustment fastener in greater detail;

Figure 1A:
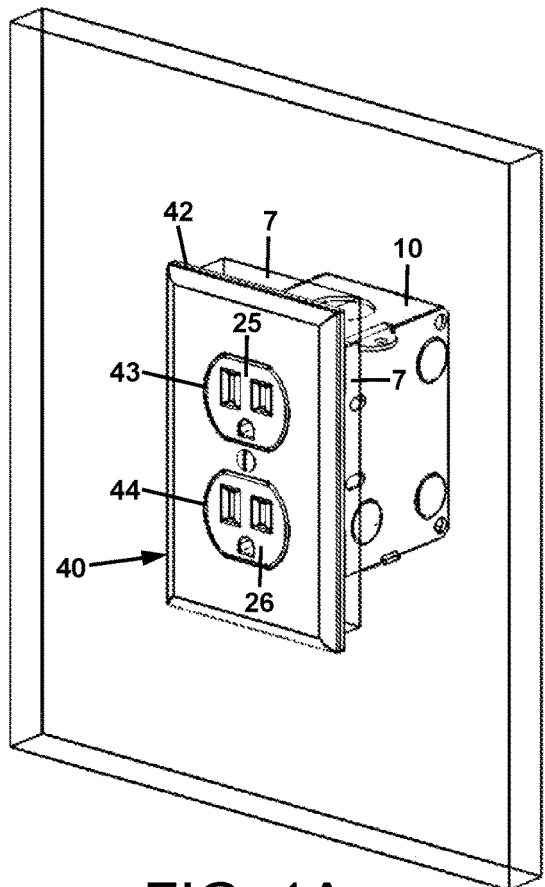
FIGS. 1A and 1B are perspective and side elevation views of a conventional electrical receptacle mounted in a desired position, with the front opening of a box that holds the receptacle coplanar with the surface of the wall in which the box is mounted.
Figure 1B:
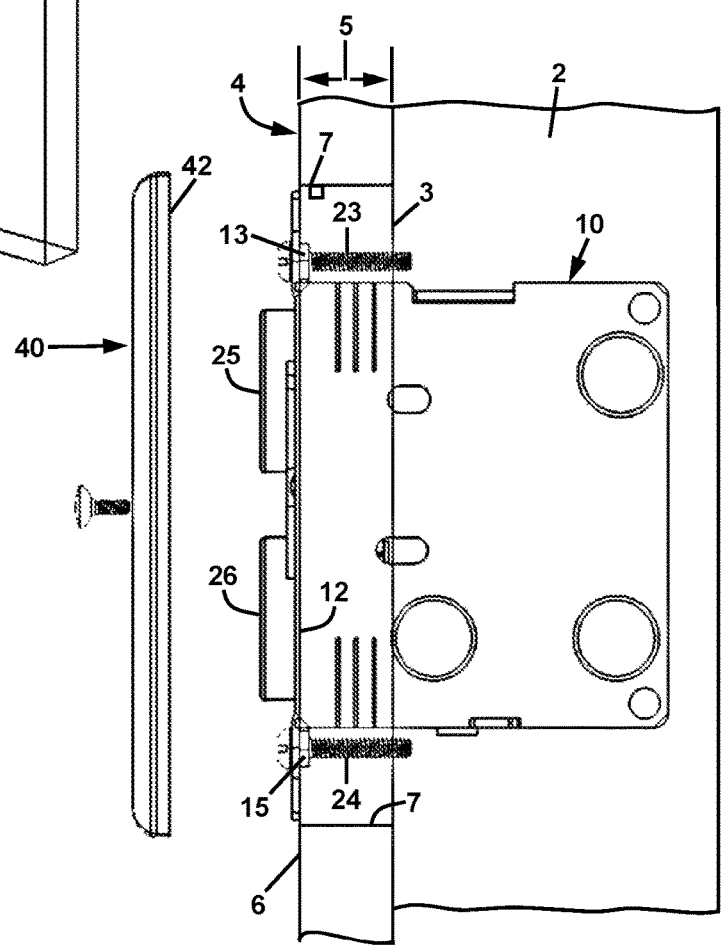
Figure 2:
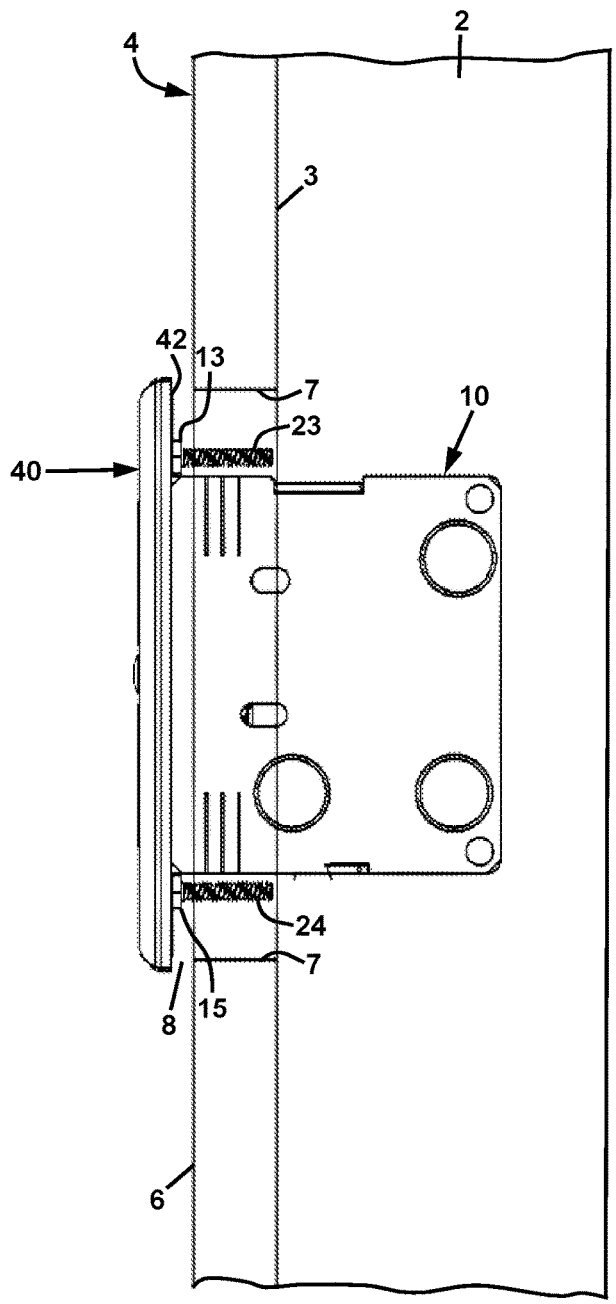
FIG. 2 is a side elevation view of a conventional electrical receptacle mounted in a first undesired position, with the front opening of the box that holds the receptacle located beyond the surface of the wall in which it is mounted.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. The drawings are to be considered exemplary, and are for purposes of illustration only. The dimensions, positions, order and relative sizes reflected in the drawings attached hereto may vary.

In the following disclosure, the present invention is described in the context of its use as embodied in a wall-mounted electrical receptacle that is provided with the capability to adjust the position of mounting in a wall. However, it is not to be construed as being limited only to use in electrical receptacles. The invention is adaptable to any use in which adjustment capability is desirable to be provided for a wall-mounted object, so as to render a reference plane of the object coplanar with a surface of the wall. Additionally, the description identifies certain components with the adjectives "top," "upper," "bottom," "lower," "left," "right," etc. These adjectives are provided in the context of use of the invention embodied in an electrical receptacle, and in the context of the orientation of the drawings, which is arbitrary. The description is not to be construed as limiting the present invention to use in a particular spatial orientation. The present invention may be used in orientations other than those shown and described herein.

It is also to be understood that any connection references used herein (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other.

Additionally, it is to be understood that as used herein, reference to a building "wall" is meant to include not only vertical walls, but also horizontal walls, such as floors and ceilings.

The fastener, fastener assembly, and electrical fixtures of the present disclosure will now be described with reference to FIGS. 5-11D. These drawings illustrate one exemplary embodiment of an electrical fixture, the exemplary embodiment being an electrical receptacle for providing 120 volts AC to electrical devices (not shown) connected thereto. It is to be understood that the application is to be considered exemplary, and that the fastener and fastener assemblies are usable with other electrical fixtures, including but not limited to lighting fixtures, ceiling fans, alarms, doorbells, smoke detectors, thermostats, telephone jacks, cable TV jacks, and Ethernet cable jacks. The fastener and fastener assemblies are also usable with other fixtures that are non-electrical fixtures.

FIGS. 5-11D depict a sequence of steps for joining the exemplary electrical receptacle to an electrical box using the fastener and fastener assemblies of the present disclosure. Thus FIGS. 5-11D depict not only the fastener, fastener assemblies, and electrical fixture, but also a method for joining a fixture to a box.

Figure 3:
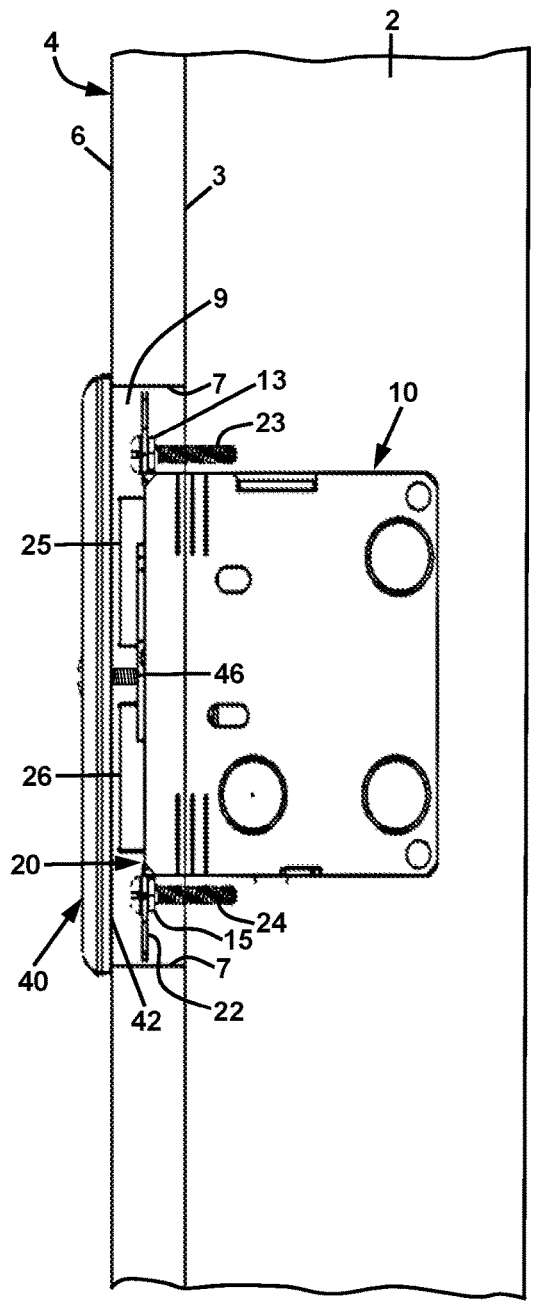
FIG. 3 is a side elevation view of a conventional electrical receptacle mounted in a second undesired position, with the front opening of the box that holds the receptacle located beneath the surface of the wall in which it is mounted.
Figure 5:
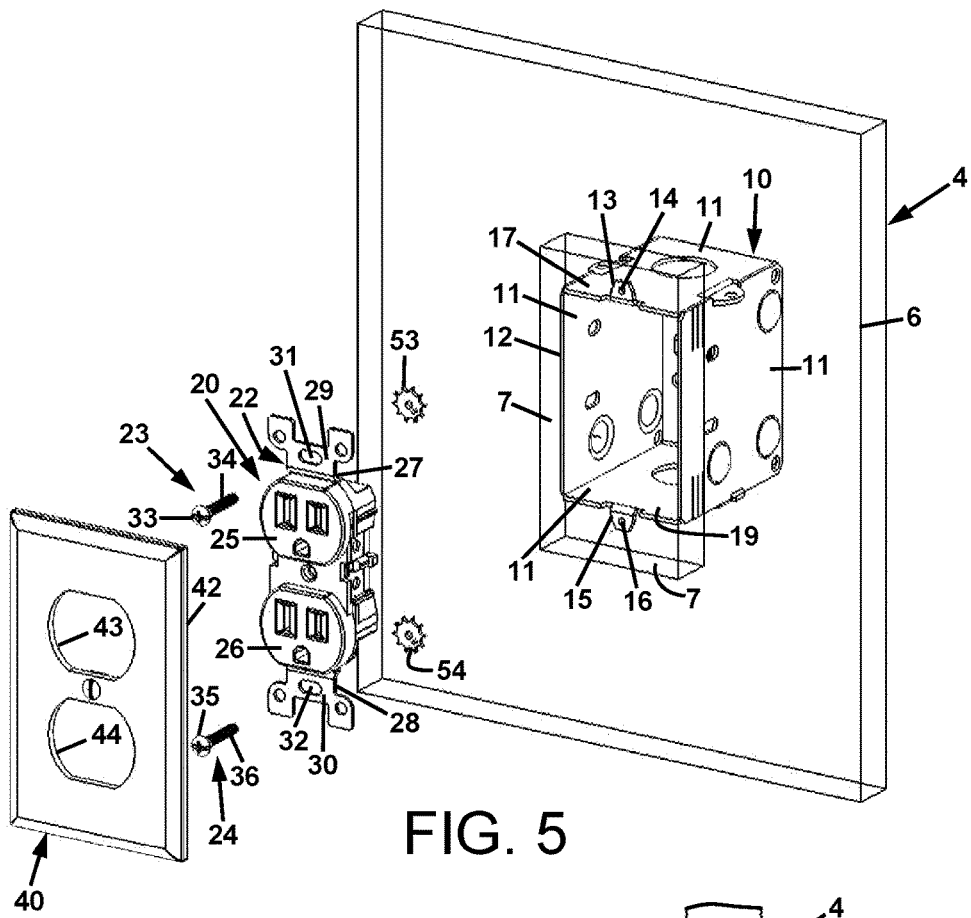
FIG. 5 is a fully exploded perspective view of a cover plate, receptacle mounting screws, electrical receptacle, and adjustment fasteners of the present disclosure, and a box that holds the receptacle mounted to a wall with the front opening of the box located beneath the surface of the wall.

Referring first to FIG. 5, a fully exploded perspective view of a cover plate, receptacle mounting screws, electrical receptacle, and adjustment fasteners of the present disclosure are depicted, along with a box that holds the receptacle. It is again noted that for clarity of illustration, in FIGS. 5-11D, the wall panel that is depicted therein is shown as if it were transparent so that that the various components or portions thereof that would otherwise be hidden by the wall, as well as their relationships to the wall can be "seen" and understood. It is also noted that in the embodiment depicted in FIGS. 5-11D, the electrical box is "improperly mounted" to the framing stud 2 as also shown in FIG. 3 and described previously. Thus the problem caused by the front opening 12 of the box 10 being recessed beneath the plane defined by the outer surface 6 of the wall 4, as shown in FIG. 3, is present. This problem is solved by the fastener, fastener assemblies, and electrical fixtures of the present disclosure, as will now be described.

Referring again to FIG. 5, an electrical receptacle 20, i.e., the "first part" referred to in this disclosure, is shown ready to be mounted in an electrical box 10, i.e., the "second part" referred to in this disclosure, using adjustment fasteners 53 and 54. The electrical box 10 is comprised of a side wall 11 terminating at an outer edge 12. The outer edge 12 of box 10 defines a planar opening, which as described above, is recessed relative to the plane of the surface 6 of wall panel 4, due to the manner in which box 10 is joined to the wall stud (stud not shown in FIGS. 5-11D, but as depicted for stud 2 of FIGS. 1B-4). It is noted that the side wall 11 of the box 10 of FIGS. 5-11D has a rectangular shape, which is formed to receive the approximately rectangular form of the receptacle 20. However, it is to be understood that boxes having other shapes made to correspond to the electrical fixtures being mounted to them may be used. For example, the electrical boxes may have square, octagonal, or circular shapes, as are commonly used in electrical wiring applications.

The box 10 includes a first tab 13 extending outwardly from a first side region 17 of the side wall 11 along the plane of the planar outer edge 12. The first tab 13 has a threaded hole 14 for engaging with a screw 23 of the receptacle 10. In like manner, the box 10 includes a second tab 15 extending outwardly from a second side region 19 of the side wall 11 along the plane of the planar outer edge 12. The second tab 15 has a threaded hole 16 for engaging with a screw 24 of the receptacle 10.

The electrical fixture 20 is comprised of a planar plate 22. In the embodiment depicted in FIGS. 5-11D, in which the electrical fixture 20 is an electrical receptacle, the electrical receptacle 20 may include plug bodies 25 and 26 that are joined to the planar plate 22.

The planar plate 22 is comprised of a first end region 27 including a first ear 29 with a first oblong hole 31 therethrough, and an opposed second end region 28 including a second ear 30 with a second oblong hole 32 therethrough. In the installation of the electrical receptacle 20 in the box 10, and in the event that the box 10 is skewed on the stud 2, the oblong holes 31 and 32 provide some adjustability of the vertical alignment of the planar plate, so that the plug bodies 25 and 26 are aligned vertically and thus have a pleasing aesthetic appearance when the cover plate 40 is joined to the receptacle 20. However, in the fastener assembly and electrical fixture of the present disclosure, the oblong holes 31 and 32 work cooperatively and advantageously with the adjustment fasteners 53 and 54 to solve the problem of the mismatched planes of the outer box edge 12 and wall surface 6, as will be explained further.

Figure 6:
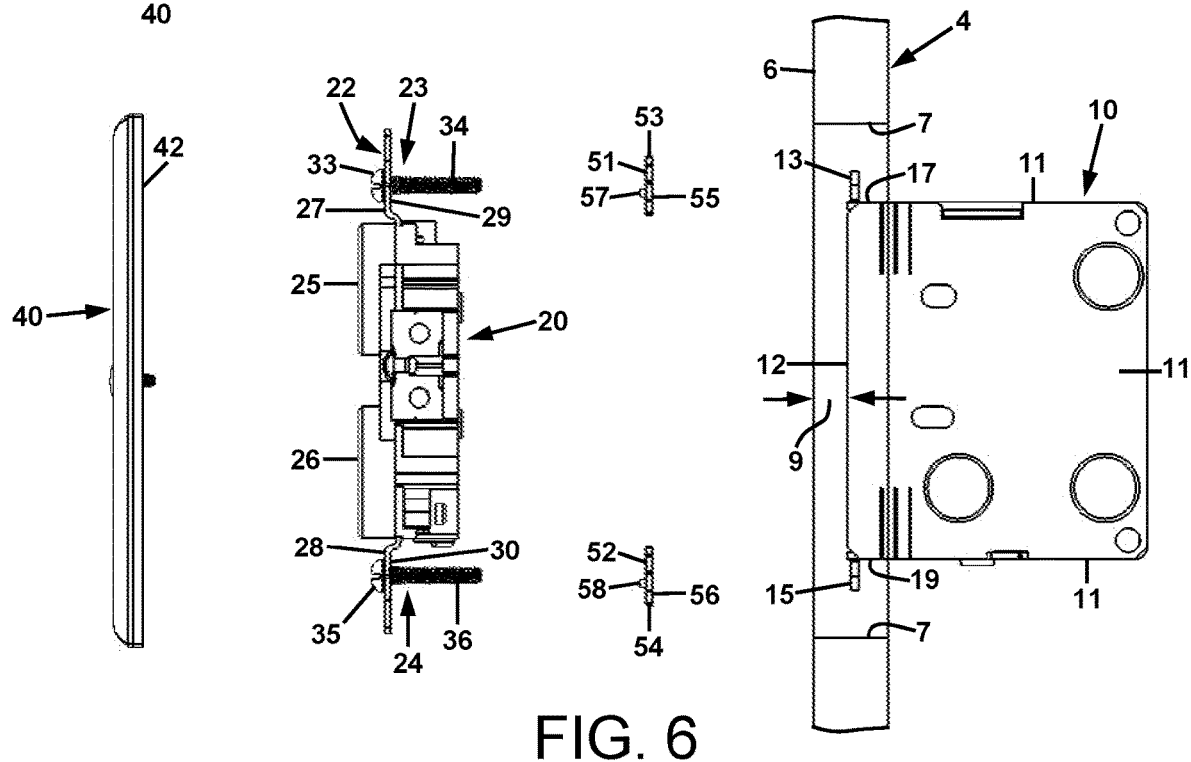
FIG. 6 is an exploded side elevation view of the components and wall depicted in FIG. 5, but with the receptacle mounting screws engaged with the electrical receptacle.

Referring to FIG. 5, and also to FIG. 6, the first screw 23 is comprised of a first head 33 and a first elongated threaded shank 34. The first head 33 of the first screw 23 is disposable against the first ear 29 of the planar plate 22 of the electrical receptacle 20, with the first threaded shank 34 extending through the first oblong hole 31 of the first ear 29 and engaged with and extending through the threaded hole of the first adjustment fastener 53, and engageable with threads in the first threaded hole 14 of the first tab 13 of the box 10. In like manner, the second screw 24 is comprised of a second head 35 and a second elongated threaded shank 36. The second head 35 of the second screw 24 is disposable against the second ear 30 of the planar plate 22, with the second threaded shank 36 extending through the second oblong hole 32 of the second ear 30. Typically, an electrical receptacle 20 is sold with the first and second screws 23 and 24 included as depicted in FIG. 6. Tinnerman-type retainer plates (not shown) made of a suitable thin plastic or fiber board material may be threaded onto the shanks 34 and 36 of the screws 23 and 24 to function as retainers so that the screws 23 and 24 do not get lost before installation of the receptacle 20 on the box 10. If these are present on a receptacle, they may be removed before proceeding with the joining of a receptacle 20 to a box 10 as described herein.

FIGS. 7A-11D in particular depict the sequence of steps executed by an electrician for joining the electrical receptacle 10 to the electrical box 20, using the adjustment fasteners 53 and 54 to position the receptacle 20 in its final installed position as depicted in FIGS. 11A-11D, with the planar plate 22 of the receptacle 20 being coplanar with the surface 6 of the wall panel 4. Thus when the cover plate 40 is joined to the electrical receptacle 20, a pleasing aesthetic appearance and a safe installation is achieved, in spite of the mismatch of the plane of the front edge 12 of the box 10 and the wall surface 6.

Referring first to FIG. 6, as a first step, the electrician determines the width of the gap 9 between the plane of the front edge 12 of the box 10 and the wall surface 6. This may be done by a careful estimate "by eye," or by placing a tool having a straight edge (not shown, but a suitable tool such as a hand held carpenter's level) along the surface 6 of the wall panel 4 across the cutout 7 in the wall panel 4, and measuring the distance from the front edge 12 of the box 10 to the straight edge. Referring to FIG. 7, the electrician then engages the first adjustment fastener 53 with the threaded shank 34 of the first screw 23, and engages the second adjustment fastener 54 with the threaded shank 36 of the second screw 24. The first adjustment fastener 53 is spun, advancing it along the threaded shank 34 of the first screw 23 until the distance 9A between the back side of the first ear 29 of the receptacle 20 and the first side 51 of the first adjustment fastener 53 is substantially equal to the length of the gap 9. In like manner, the second adjustment fastener 54 is spun, advancing it along the threaded shank 36 of the second screw 24 until the distance 9B between the back side of the second ear 30 of the receptacle 20 and the first side 52 of the second adjustment fastener 54 is substantially equal to the length of the gap 9.

Figure 4:
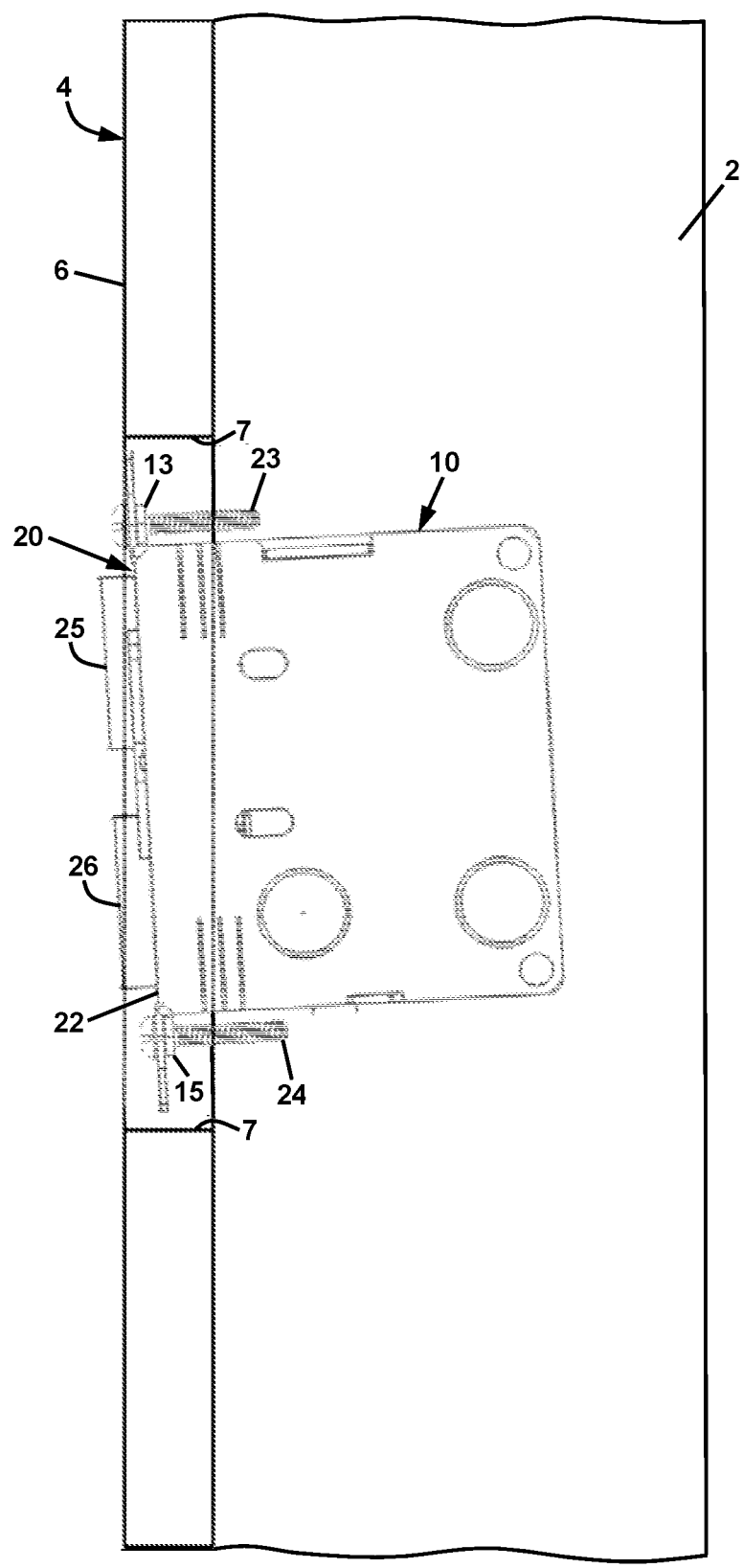
FIG. 4 is a side elevation view of a conventional electrical receptacle mounted in a third undesired position, with the front opening of the box that holds the receptacle skewed relative to the surface of the wall in which it is mounted.

In the event that the electrical box 10 is skewed with respect to the plane 6 of the wall panel 4 as shown in FIG. 4 and previously described, the electrician will need to make separate measurements of the gaps between the straight edge and the tabs 13 and 15 of the box 10. The electrician will then position the adjustment fastener 53 on the screw 23 with the first side 51-to-planar plate 22 gap matching the gap between the tab 13 and wall surface 6, and will also position the adjustment fastener 54 on the screw 24 with the first side 52-to-planar plate 22 gap matching the gap between the tab 15 and wall surface 6. In that manner, the problem caused by a skewed electrical box can be easily solved using the adjustment fasteners 53 and 54, the positions of which on their respective screws 23 and 24 are independently adjustable.

In either situation, the electrician then moves the assembled receptacle 20/screws 23 and 24/adjustment fasteners 53 and 54 to the position relative to the box 10 as shown in FIG. 7A-7C, with the respective screws 23 and 24 positioned to engage with the respective threaded holes 14 and 16 of tabs 13 and 15. It is noted that at this point of the installation, electrical wires contained within box 10 would be connected to various terminals on the receptacle 20. However, depiction of such wires is not required for understanding the present disclosure, and so for simplicity of illustration, such wires are not shown.

Figure 8A:
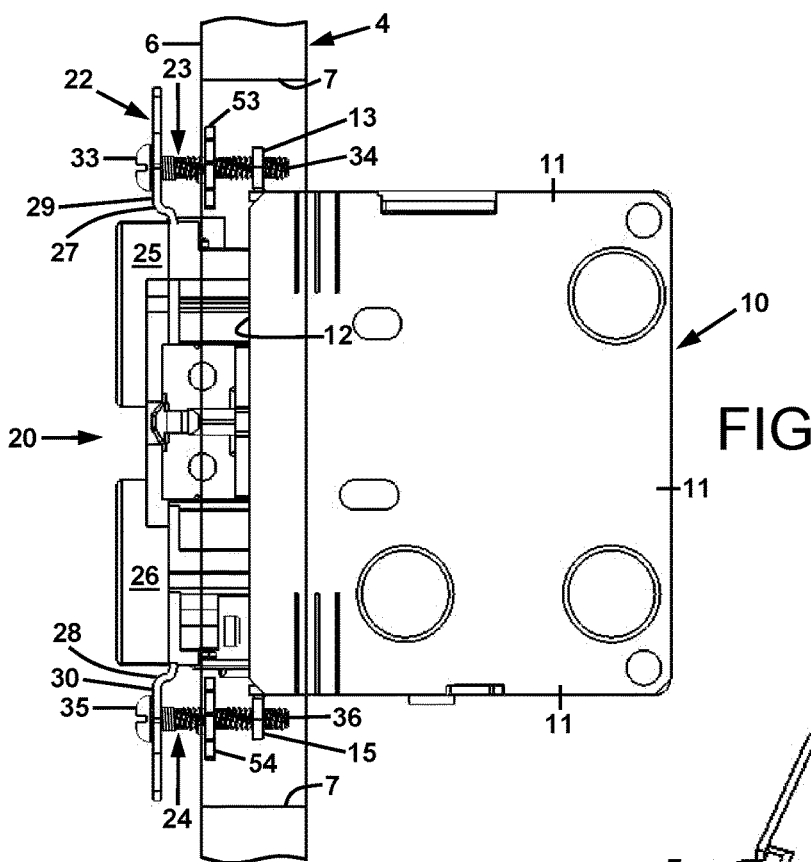
FIG. 8A is a side elevation view of the components and wall, but with the adjustment fasteners engaged with the mounting screws of the electrical receptacle further screwed into the threaded tabs on the electrical box, such that the adjustment fasteners have moved to a position coplanar with the front opening of the box.
Figure 8B:
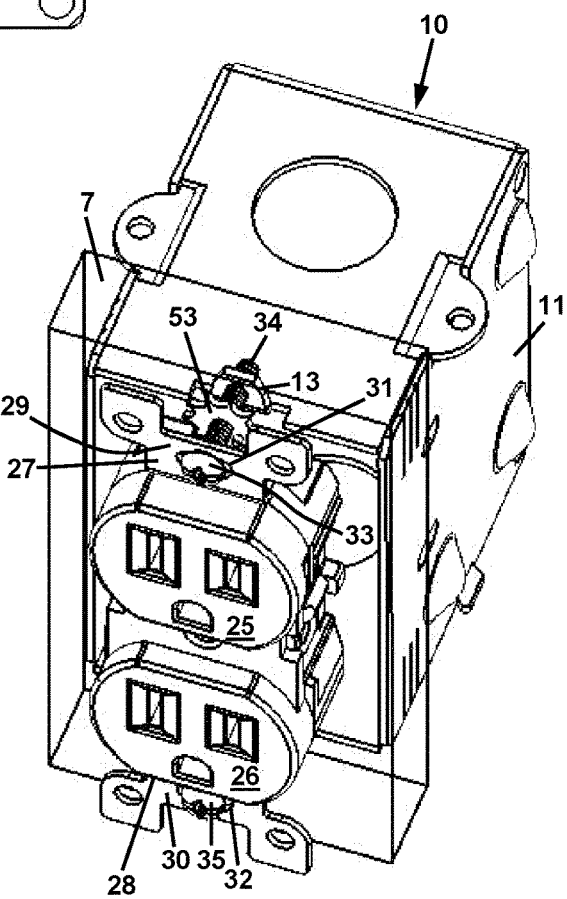
FIG. 8B is a perspective view of the components and wall as depicted in FIG. 8A.

The electrician then turns the screws 23 and 24, engaging them with and driving them through the respective threaded holes 14 and 16 of tabs 13 and 15 of the box 10. As the electrician turns screw 23, the adjustment fastener 53 that is disposed on the threaded shank 34 of screw 23 also turns with screw 23. The electrician turns screw 23 until the first side 51 of the adjustment fastener 53 reaches a location that is substantially coplanar with the surface 6 of the wall panel 4. The first side 51 of the adjustment fastener 53 may be located slightly past the plane of wall surface 6 by an amount equal to the thickness of the planar plate 22 of the receptacle for a reason that will become apparent. At this point, the screw 23, adjustment fastener 53, wall panel 4, ear 29 of receptacle 20, and box 10 are positioned relative to each other as shown in FIGS. 8A-8C.

In like manner, the electrician turns screw 24 until the first side 52 of the adjustment fastener 54 reaches a location that is substantially coplanar with the surface 6 of the wall panel 4. The first side 52 of the adjustment fastener 54 may also be located slightly past the plane of wall surface 6 by an amount equal to the thickness of the planar plate 22 of the receptacle. At this point, the screw 24, adjustment fastener 54, wall panel 4, ear 30 of receptacle 20, and box 10 are also positioned relative to each other as shown in FIGS. 8A-8C.

Figure 8C:
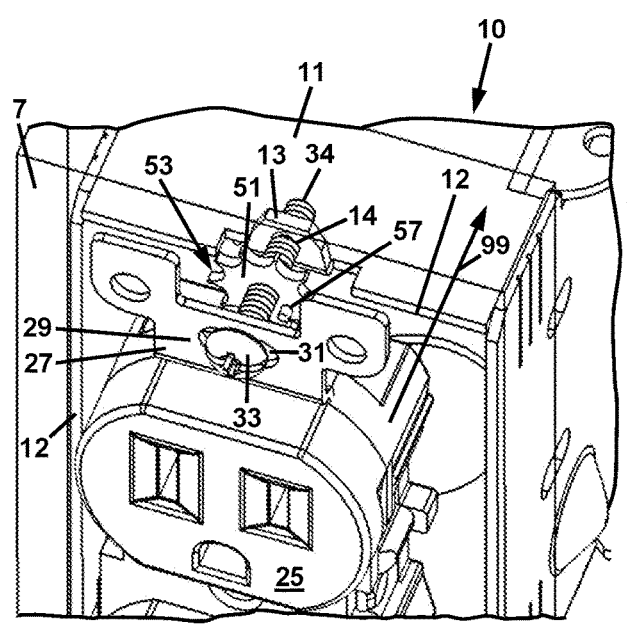
FIG. 8C is a detailed perspective view of the components and wall as depicted in FIG. 8B, showing the top adjustment fastener in greater detail.

The electrician then stops turning the screws 23 and 24, and applies a horizontal force to the receptacle 20, pushing it toward box 10, as indicated by arrow 99 of FIG. 8C. This pushing action moves the receptacle 20 toward the box 10 until the back side of the ear 29 contacts the tang 57 of the adjustment fastener 53, and the back side of the ear 30 contacts the tang 58 of the adjustment fastener 54, thereby stopping the horizontal motion of the receptacle 20 with the planar plate substantially coplanar with the plane of the wall panel 6.

Figure 10A:
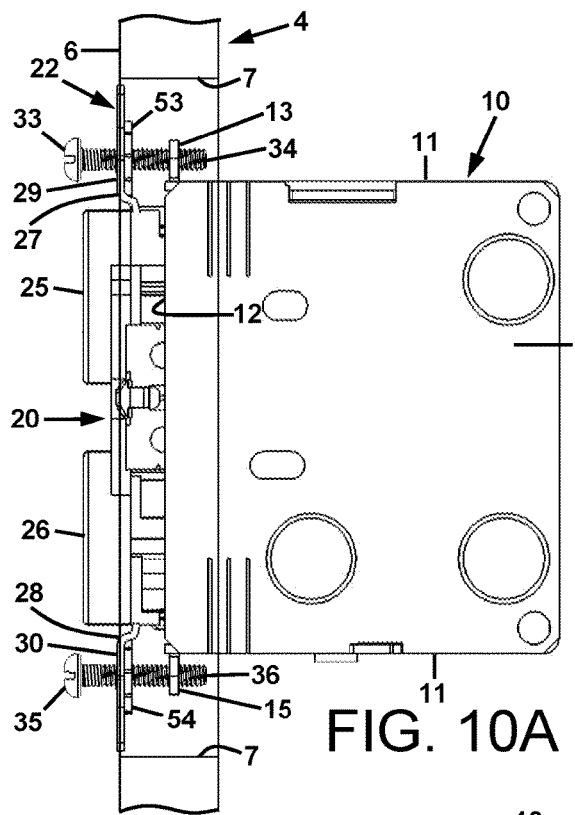
FIG. 10A is a side elevation view of the components and wall, but with the electrical receptacle displaced outwardly such that the tangs of the adjustment fasteners are disposed in respective oblong mounting holes of the receptacle.
Figure 10B:
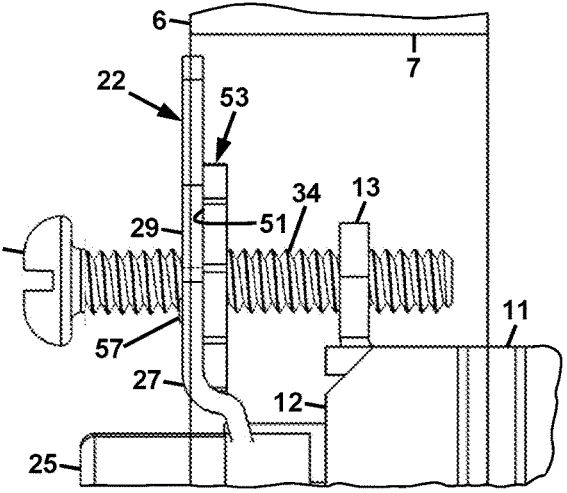
FIG. 10B is a detailed side elevation view of the components and wall as depicted in FIG. 10A, showing the top portion of the receptacle, the top mounting screw, and the top adjustment fastener with the tang thereof disposed in the top oblong mounting hole of the receptacle.
Figure 10C:
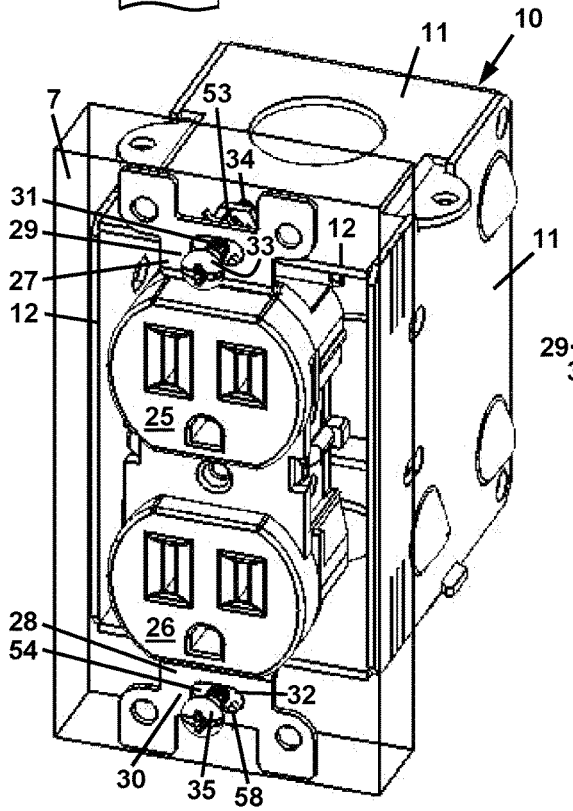
FIG. 10C is a perspective view of the components and wall as depicted in FIG. 10A.
Figure 10D:
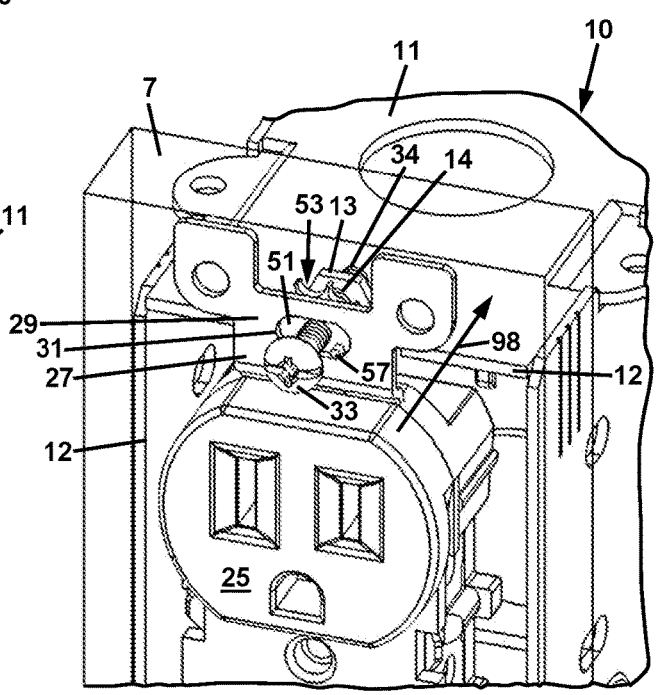
FIG. 10D is a detailed perspective view of the components and wall as depicted in FIG. 10C, showing the top adjustment fastener with the tang thereof disposed in the top oblong mounting hole of the receptacle in greater detail.

Referring to FIGS. 10A-10D, screw 23 and adjustment faster 53 are then turned again slightly while applying a gentle horizontal force as indicated by arrow 98 (FIG. 10D). The force is low enough so that the adjustment fastener 53 turns with the screw 23, but sufficient so that when the tang 57 aligns with the oblong hole 31 of ear 29, it advances into oblong hole 31, as shown particularly in FIG. 10D. (It will be apparent that depending upon the position of the tang 57 at the point of engagement, it may advance into the oblong hole 31 at the opposite end thereof.) At this point, by virtue of the engagement of the tang 57 with oblong hole 31, the adjustment fastener 53 is immobilized against the ear 29 of the planar plate 22.

In like manner, screw 24 and adjustment faster 54 are also turned again slightly while applying the gentle horizontal force. When the tang 58 aligns with the oblong hole 32 of ear 30, it advances into oblong hole 32. At this point, the adjustment fastener 54 is immobilized against the ear 30 of the planar plate 22.

With the adjustment fastener 53 immobilized against the ear 29 of the planar plate 22 of the receptacle 20, any further turning of screw 23 will advance the screw 23 inwardly horizontally relative to the receptacle 20, the adjustment fastener 53, and the tab 13 of the box 10. Likewise, with the adjustment fastener 54 immobilized against the ear 30 of the planar plate 22 of the receptacle 20, any further turning of screw 24 will advance the screw 24 inwardly horizontally relative to the receptacle 20, the adjustment fastener 54, and the tab 14 of the box 10.

This aspect is used advantageously to secure the receptacle 20 in its final position in box 10, which is depicted in FIGS. 11A-11D. It can be seen that screw 23 has been advanced to the point where the head 33 of screw 23 has seated against the ear 29 of the planar plate 22, at which point screw 23 can no longer be turned. Likewise, screw 24 has been advanced to the point where the head 35 of screw 24 has seated against the ear 30 of the planar plate 22, at which point screw 24 can also no longer be turned. With the engagement of screws 23 and 24 with respective adjustment fasteners 53 and 54 immobilized against the planar plate 22, the screws 23 and 24 are also tight, resulting in the receptacle 20 being firmly joined to the box 10. Advantageously, the planar plate 22 of the receptacle 20 in its final position is coplanar with the surface 6 of the wall panel 4. Thus when the cover plate 40 is joined to the receptacle 20, a pleasing aesthetic appearance and a safe installation is achieved.

It is noted that in the event that the electrician does not choose the optimal locations of the adjustment fasteners 53 and 54 on the respective screws 23 and 24 at the step depicted in FIGS. 7A-7C, and as a result, the planar plate 22 of the receptacle 20 is not coplanar with the surface 6 of wall panel 4 as desired per FIGS. 11A-11D, this can be corrected easily and quickly. The electrician simply unscrews screws 23 and 24 from the receptacle 20 slightly, and pulls the receptacle outwardly, thereby releasing the tangs 57 and 58 from the respective oblong holes 31 and 32. The adjustment fasteners 53 and 54 can then be rotated on their respective screws 23 and 24, advancing or withdrawing them as needed to reset their positions. This is easily done by engaging a thin rod-shaped tool, such as a small screwdriver, with the teeth of the tangs 57 and 58. Once the adjustment fasteners 53 and 54 are in the desired positions on the respective screws 23 and 24, the receptacle 20 is then pushed in toward the box 10 as indicated by arrow 99 in FIG. 8C, and the steps previously described and shown in FIGS. 10A-1D, and in FIGS. 11A-11D are repeated to secure the receptacle 20 in its final position. The above procedure is particularly effective in mounting a receptacle 20 in a box 10 that has skew as shown in FIG. 4, because it can be difficult to judge the exact required positions of the adjustment fasteners 53 and 54 on the first attempt.

Figure 11A:
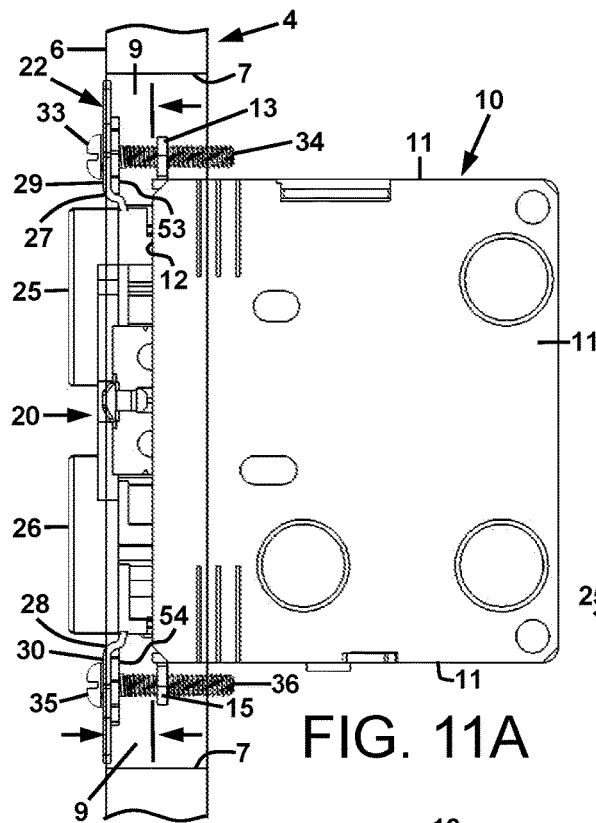
FIG. 11A is a side elevation view of the components and wall, but with the electrical receptacle mounted in its final position in the box, with the mounting plate of the receptacle coplanar with the surface of the wall.
Figure 11B:
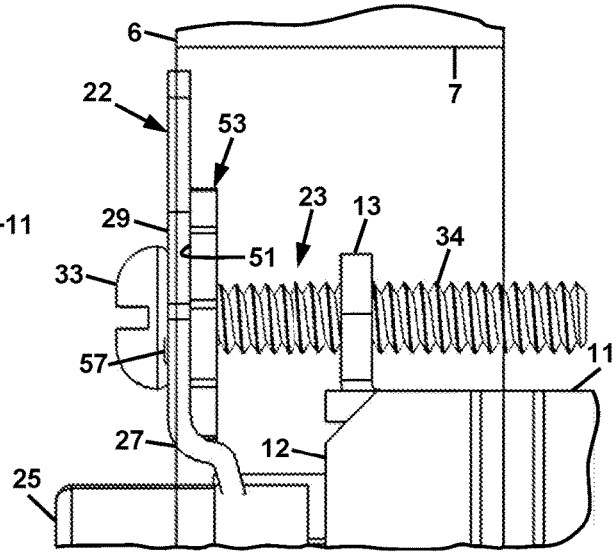
FIG. 11B is a detailed side elevation view of the components and wall as depicted in FIG. 11A, showing the top portion of the receptacle, the top mounting screw, and the top adjustment fastener in their final positions in greater detail.
Figure 11C:
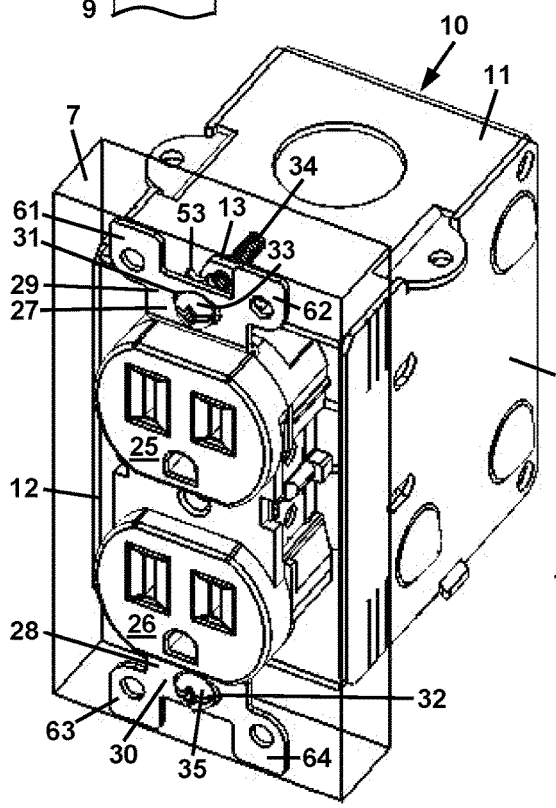
FIG. 11C is a perspective view of the components and wall as depicted in FIG. 11A.
Figure 11D:
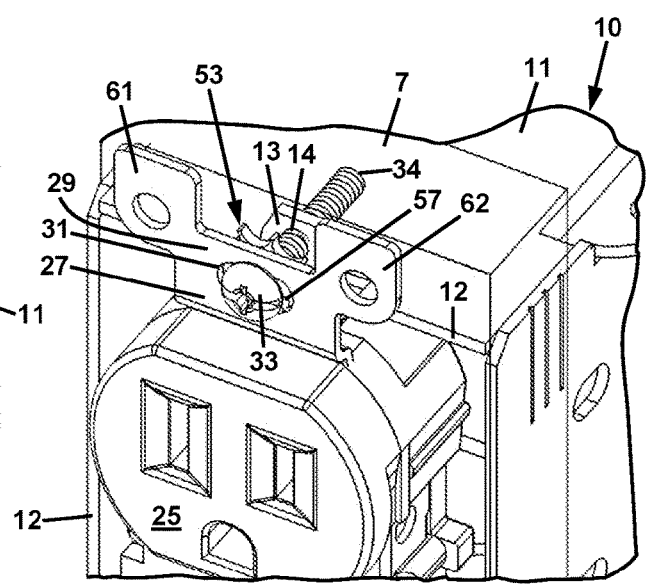
FIG. 11D is a detailed perspective view of the components and wall as depicted in FIG. 11C, showing the top portion of the receptacle, the top mounting screw, and the top adjustment fastener in their final positions in greater detail.

Referring to FIGS. 11C and 11D, it is further noted that a common receptacle is often manufactured with additional side ears 61-64. These ears are typically used in situations where cutout 7 in the wall panel 4 is smaller than shown in FIGS. 5-11D, so that the receptacle can be joined to the wall panel with the overlapping plaster ears instead of being joined to the box 10. For this reason, receptacle manufacturers provide receptacles with the ears 61-64, often with scores in the planar plate so that they are easy to break off if not needed. Advantageously, the Applicant's adjustment fastener and fastener assemblies obviate the need for these side ears. This is beneficial because elimination of such ears simplifies the stamping die used to stamp blank planar plate stock material, and also reduces the size of the piece of sheet metal needed to make a planar plate. Accordingly, the manufacturing cost of making a receptacle is reduced.

It is further noted that in certain embodiments, the fastener assemblies of the present disclosure provides a solid mounting solution for a receptacle, wherein a torque specification may be applied to the mounting screws. In such embodiments, the torque specification will not change over time as it does under current method where the drywall panel is a component of the installation process. Thus if the drywall panel or framing studs shrink over time, causing a receptacle to loosen in its receptacle box, the fastener assemblies may be easily be readjusted the desired torque setting, thereby firmly re-securing the receptacle and its cover plate.

EXAMPLES

Figure 9A:
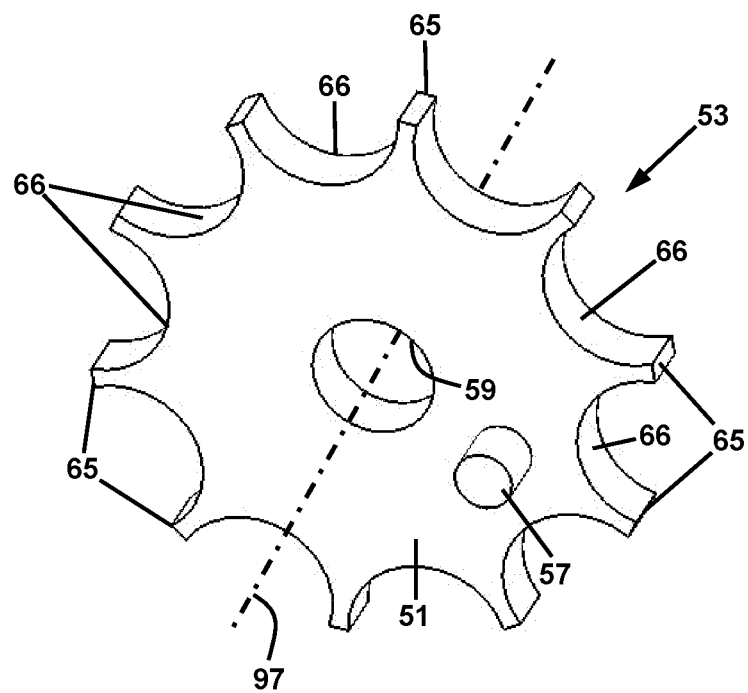
FIG. 9A is a detailed perspective view of the adjustment fastener of the present disclosure.
Figure 9B:
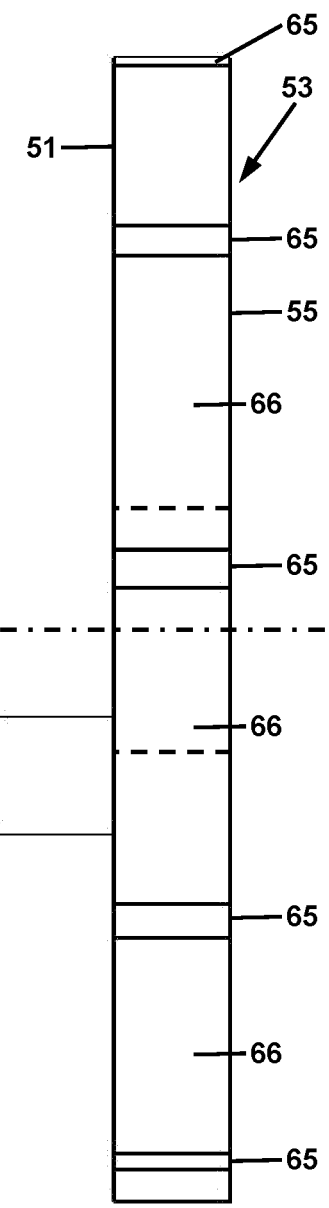
FIG. 9B is a side elevation view of the adjustment fastener taken along line 9B-9B of FIG. 9A.

A prototype pair of adjustment fasteners was fabricated, both of which were as depicted for the adjustment fastener 53 of FIGS. 9A and 9B. The fasteners 53 were cut from 0.050 inches thick 304 stainless steel sheet metal, and comprised a sequence of ten teeth 65 interspersed with ten notches 66 around the perimeter. Central through holes 59 were drilled along central axis 97 and tapped with 6-32 UNC threads, which enabled engagement with the 6-32 screws commonly used on electrical receptacles. Tang rods having a diameter of 0.050 inches and a length of 0.090 inches were fabricated. Second through holes were drilled into the bodies of the adjustment fasteners 53, with a bore diameter enabling an interference fit with the tang rods. The tang rods were then inserted into the second through holes then fusion welded, resulting in the finished adjustment fasteners 53 shown in FIGS. 9A and 9B. The tangs 57 protruded from the surfaces 51 of the bodies 0.040" inches.

The adjustment fasteners 53 were then fitted to a purchased electrical receptacle, and the steps described above were executed to install the receptacle in a box. This trial installation was successful, and the prototype adjustment fasteners and fastener assemblies functioned as described herein.

In another prototype fabrication, a prototype pair of adjustment fasteners was fabricated as described above, both of which were as depicted for the adjustment fastener 53 of FIGS. 9A and 9B, but instead tapped with 10-32 UNF threads in the central through holes. Such adjustment fasteners were used to mount a ceiling fan to an electrical box that was installed in a ceiling, i.e., a horizontal wall. This trial installation was also successful, and the prototype adjustment fasteners and fastener assemblies functioned as described herein. In yet another prototype fabrication, a prototype pair of adjustment fasteners was fabricated as described above, but instead tapped with 10-24 UNC threads in the central through holes. These adjustment fasteners were also found to work in a satisfactory manner.

From the above prototype examples, and additional prototyping, the Applicant has found that adjustment fasteners as depicted in FIGS. 9A and 9B, which have planar bodies, are most effective in functioning as described herein. Such planar bodies seat effectively between the planar plate of the receptacle and the tabs of the electrical box, and the tangs protruding from the bodies drop into the oblong holes of the receptacles and engage firmly with them. Additionally, the planar bodies are provided sufficiently thick so that the central through holes may be drilled and tapped with a range of thread sizes from 6-32 to 10-32, thus spanning a range of applications from receptacle installation ("light duty") to ceiling fan installation ("heavy duty"). Additionally, by providing the adjustment fasteners with a planar body and of sufficient thickness, in the event that repeated adjustment of the positions of the adjustment fasteners on the respective screws is needed in order to locate the receptacle or other fixture properly with respect to the surface of the wall panel, the adjustment fasteners of the present disclosure can be repeatedly tightened and loosened as described herein, without galling or stripping out the threads, which would otherwise render them ineffective. This is in contrast to the performance of prior art devices that are made of relatively thin sheet metal and formed in a non-planar configuration.

It is therefore apparent that there has been provided, in accordance with the present disclosure, a fastener and a fastener assembly for joining a first part to a second part, an electrical fixture including the fastener assembly, and methods of use of the fastener assembly. The foregoing description of technology and the invention is merely exemplary in nature of the subject matter, manufacture, and use of the invention and is not intended to limit the scope, application, or uses of any specific invention claimed in this application or in such other applications as may be filed claiming priority to this application, or patents issuing therefrom. The following definitions and non-limiting guidelines must be considered in reviewing the description.

The headings in this disclosure (such as "Background" and "Summary") and sub-headings used herein are intended only for general organization of topics within the present technology, and are not intended to limit the disclosure of the present technology or any aspect thereof. Subject matter disclosed in the "Summary" is not an exhaustive or complete disclosure of the entire scope of the technology or any embodiments thereof.

To the extent that other references may contain similar information in the Background herein, said statements do not constitute an admission that those references are prior art or have any relevance to the patentability of the technology disclosed herein. Any discussion in the Background is intended merely to provide a general summary of problems addressed by the present invention.

The description and specific examples, while indicating embodiments of the technology disclosed herein, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the devices and methods of this technology and, unless explicitly stated otherwise, are not intended to be a representation that given embodiments of this technology have, or have not, been made or tested.

To the extent employed herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

Unless otherwise specified, relational terms used in the present disclosure should be construed to include certain tolerances that those skilled in the art would recognize as providing equivalent functionality. By way of example, the term perpendicular is not necessarily limited to 90.00°, but also to any variation thereof that those skilled in the art would recognize as providing equivalent functionality for the purposes described for the relevant member or element. Terms such as "about" and "substantially" in the context of configuration relate generally to disposition, location, and/or configuration that is either exact or sufficiently close to the location, disposition, or configuration of the relevant element to preserve operability of the element within the invention while not materially modifying the invention. Similarly, unless specifically specified or clear from its context, numerical values should be construed to include certain tolerances that those skilled in the art would recognize as having negligible importance, as such do not materially change the operability of the invention.

As used herein, the words "comprise," "include," "contain," and variants thereof are intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Having thus described the basic concept of the invention, it will be apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be expressly stated in the claims.

We claim:

1. A method of joining a first part comprising an ear having an oblong hole therethrough to a second part comprising a tab having a threaded hole therethrough, the method comprising:
    a) engaging a screw comprising a head and an elongated threaded shank extending through the oblong hole of the ear of the first part with an adjustment fastener comprised of a body having a threaded hole extending along a central axis through the body and a tang joined to the body adjacent to the threaded hole and extending outwardly toward the ear of the first part in a direction parallel to the central axis;
    b) rotating the adjustment fastener on the screw to a desired location on the threaded shank of the screw;
    c) moving the first part proximate to the second part and engaging the threaded shank of the screw with the threaded hole of the tab of the second part;
    d) rotating the screw and adjustment fastener relative to the tab of the second part until the adjustment fastener is at a desired location relative to the second part;
    e) moving the first part toward the second part until the adjustment fastener contacts the ear of the first part and the tang of the adjustment fastener is engaged with the oblong hole of the ear of the first part; and
    f) rotating the screw until the ear of the first part is immobilized between the head of the screw and the adjustable fastener.

2. The method of claim 1, wherein the second part is mounted in a cavity of a wall and an outer surface of the second part is located at a fixed distance below an outer planar surface of the wall, and wherein the desired location of the first adjustment fastener on the threaded shank of the first screw is substantially coplanar with the outer planar surface of the wall.

3. The method of claim 2, further comprising measuring the fixed distance between the outer surface of the second part and the outer planar surface of the wall.

4. A method of joining a first part comprising a first ear having a first oblong hole therethrough and a second ear having a second oblong hole therethrough to a second part comprising a first tab having a first threaded hole therethrough and a second tab having a second threaded hole therethrough, the method comprising:
    a) engaging a first screw comprising a first head and a first elongated threaded shank extending through the first oblong hole of the first ear of the first part with a first adjustment fastener comprised of a first body having a first threaded hole extending along a central axis through the first body and a first tang joined to the first body adjacent to the first threaded hole and extending outwardly toward the first ear of the first part in a direction parallel to the central axis of the first adjustment fastener;
    b) engaging a second screw comprising a second head and a second elongated threaded shank extending through the second oblong hole of the second ear of the first part with a second adjustment fastener comprised of a second body having a second threaded hole extending along a central axis through the second body and a second tang joined to the second body adjacent to the second threaded hole and extending outwardly toward the second ear of the first part in a direction parallel to the central axis of the second adjustment fastener;
    c) rotating the first adjustment fastener on the first screw to a first desired location on the first threaded shank of the first screw;
    d) rotating the second adjustment fastener on the second screw to a second desired location on the second threaded shank of the second screw;
    e) moving the first part proximate to the second part and engaging the first threaded shank of the first screw with the first threaded hole of the first tab of the second part, and engaging the second threaded shank of the second screw with the second threaded hole of the second tab of the second part;
    f) rotating the first screw and first adjustment fastener relative to the first tab of the second part until the first adjustment fastener is at a first desired location relative to the second part;
    g) rotating the second screw and second adjustment fastener relative to the second tab of the second part until the second adjustment fastener is at a second desired location relative to the second part;
    h) moving the first part toward the second part until the first adjustment fastener contacts the first ear of the first part and the first tang of the first adjustment fastener is engaged with the first oblong hole of the first ear of the first part;
    i) moving the first part until the second adjustment fastener contacts the second ear of the first part and the second tang of the second adjustment fastener is engaged with the second oblong hole of the second ear of the first part;
    j) rotating the first screw until the first ear of the first part is immobilized between the first head of the first screw and the first adjustable fastener; and
    k) rotating the second screw until the second ear of the first part is immobilized between the second head of the second screw and the second adjustable fastener.

5. The method of claim 4, wherein the first part is mounted in a cavity of a wall and an outer surface of the second part is located at a fixed distance below an outer planar surface of the wall, and wherein the first desired location of the first adjustment fastener on the first threaded shank of the first screw and the second desired location of the second adjustment fastener on the second threaded shank of the second screw are substantially coplanar with the outer planar surface of the wall.

6. The method of claim 4, wherein the second part is mounted in a cavity of a wall and an upper portion of an outer surface of the second part is located at a first distance below an outer planar surface of the wall and a lower portion of the outer surface of the second part is located at a second distance below an outer planar surface of the wall, and wherein the first desired location of the first adjustment fastener on the first threaded shank of the first screw and the second desired location of the second adjustment fastener on the second threaded shank of the second screw are substantially coplanar with the outer planar surface of the wall.

7. The method of claim 6, further comprising measuring the first distance between the upper portion of the outer surface of the second part and the outer planar surface of the wall and measuring the second distance between the lower portion of the outer surface of the second part and the outer planar surface of the wall.

8. A method of joining an electrical fixture comprising a first ear having a first oblong hole therethrough and a second ear having a second oblong hole therethrough to an electrical box comprising a first tab having a first threaded hole therethrough and a second tab having a second threaded hole therethrough, the method comprising:

a) engaging a first screw comprising a first head and a first elongated threaded shank extending through the first oblong hole of the first ear of the electrical fixture with a first adjustment fastener comprised of a first body having a first threaded hole extending along a central axis through the first body and a first tang joined to the first body adjacent to the first threaded hole and extending outwardly toward the first ear of the electrical fixture in a direction parallel to the central axis of the first adjustment fastener;

b) engaging a second screw comprising a second head and a second elongated threaded shank extending through the second oblong hole of the second ear of the electrical fixture with a second adjustment fastener comprised of a second body having a second threaded hole extending along a central axis through the second body and a second tang joined to the second body adjacent to the second threaded hole and extending outwardly toward the second ear of the electrical fixture in a direction parallel to the central axis of the second adjustment fastener;

c) rotating the first adjustment fastener on the first screw to a first desired location on the first threaded shank of the first screw;

d) rotating the second adjustment fastener on the second screw to a second desired location on the second threaded shank of the second screw;

e) moving the electrical fixture proximate to the electrical box and engaging the first threaded shank of the first screw with the first threaded hole of the first tab of the electrical box, and engaging the second threaded shank of the second screw with the second threaded hole of the second tab of the electrical box;

f) rotating the first screw and first adjustment fastener relative to the first tab of the electrical box until the first adjustment fastener is at a first desired location relative to the electrical box;

g) rotating the second screw and second adjustment fastener relative to the second tab of the electrical box until the second adjustment fastener is at a second desired location relative to the electrical box;

h) moving the electrical fixture toward the electrical box until the first adjustment fastener contacts the first ear of the electrical fixture and the first tang of the first adjustment fastener is engaged with the first oblong hole of the first ear of the electrical fixture;

i) moving the electrical fixture until the second adjustment fastener contacts the second ear of the electrical fixture and the second tang of the second adjustment fastener is engaged with the second oblong hole of the second ear of the electrical fixture;

j) rotating the first screw until the first ear of the electrical fixture is immobilized between the first head of the first screw and the first adjustable fastener; and k) rotating the second screw until the second ear of the electrical fixture is immobilized between the second head of the second screw and the second adjustable fastener.

9. The method of claim 8, wherein the electrical box is mounted in a cavity of a wall and an outer surface of the electrical box is located at a fixed distance below an outer planar surface of the wall, and wherein the first desired location of the first adjustment fastener on the first threaded shank of the first screw and the second desired location of the second adjustment fastener on the second threaded shank of the second screw are substantially coplanar with the outer planar surface of the wall.

10. The method of claim 8, wherein the electrical box is mounted in a cavity of a wall and an upper portion of an outer surface of the electrical box is located at a first distance below an outer planar surface of the wall and a lower portion of the outer surface of the electrical box is located at a second distance below an outer planar surface of the wall, and wherein the first desired location of the first adjustment fastener on the first threaded shank of the first screw and the second desired location of the second adjustment fastener on the second threaded shank of the second screw are substantially coplanar with the outer planar surface of the wall.

11. The method of claim 10, further comprising measuring the first distance between the upper portion of the outer surface of the electrical box and the outer planar surface of the wall and measuring the second distance between the lower portion of the outer surface of the electrical box and the outer planar surface of the wall.

* * * * *